US012159277B2

(12) United States Patent
Nyamwange

(10) Patent No.: US 12,159,277 B2
(45) Date of Patent: Dec. 3, 2024

(54) USER-SIDE NON-FUNGIBLE TOKEN STORAGE USING SUPER NON-VOLATILE RANDOM ACCESS MEMORY

(71) Applicant: BANK OF AMERICA CORPORATION, Charlotte, NC (US)

(72) Inventor: Elvis Nyamwange, Little Elm, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 272 days.

(21) Appl. No.: 17/868,235

(22) Filed: Jul. 19, 2022

(65) Prior Publication Data

US 2024/0029056 A1 Jan. 25, 2024

(51) Int. Cl.
*G06Q 20/36* (2012.01)
*G06F 3/06* (2006.01)

(52) U.S. Cl.
CPC ....... *G06Q 20/3678* (2013.01); *G06F 3/0604* (2013.01); *G06F 3/0631* (2013.01); *G06F 3/0679* (2013.01); *G06Q 2220/00* (2013.01)

(58) Field of Classification Search
CPC .......... G06Q 20/3678; G06Q 2220/00; G06Q 20/36; G06Q 30/06; G06Q 40/04; G06F 3/0604; G06F 3/0631; G06F 3/0679; H04L 9/3239; H04L 9/50
See application file for complete search history.

(56) References Cited

U.S. PATENT DOCUMENTS

| | | | |
|---|---|---|---|
| 8,051,246 B1 * | 11/2011 | Caklovic | G06F 12/0866 711/170 |
| 8,755,377 B2 | 6/2014 | Nakil et al. | |
| 8,939,356 B2 | 1/2015 | Pourfallah et al. | |
| 9,374,270 B2 | 6/2016 | Nakil et al. | |
| 9,400,645 B2 | 7/2016 | Mahajan et al. | |
| 9,473,394 B1 | 10/2016 | Sivaramakrishnan et al. | |
| 9,747,096 B2 | 8/2017 | Searle et al. | |
| 9,898,317 B2 | 2/2018 | Nakil et al. | |
| 10,263,832 B1 | 4/2019 | Ghosh | |
| 10,382,331 B1 | 8/2019 | Sivaramakrishnan | |
| 10,567,275 B2 | 2/2020 | Babu et al. | |
| 11,070,452 B1 | 7/2021 | Roy et al. | |
| 11,379,263 B2 | 7/2022 | Wentz | |
| 11,557,174 B2 | 1/2023 | Simons | |
| 2018/0158162 A1 | 6/2018 | Ramasamy | |
| 2019/0012085 A1 * | 1/2019 | Schreter | H04L 69/40 |
| 2020/0042721 A1 * | 2/2020 | Castinado | H04L 9/0637 |
| 2020/0042989 A1 | 2/2020 | Ramadoss et al. | |

(Continued)

*Primary Examiner* — Farley Abad
(74) *Attorney, Agent, or Firm* — Moore & Van Allen PLLC; James C. Edwards

(57) ABSTRACT

A system for leveraging local/user-side resources (i.e., memory) to store Non-Fungible Tokens (NFTs) and conduct NFT-related computational processes required for generating/minting or exchanging an NFT. The local/user device is equipped with super Non-Volatile Random Access Memory (NVRAM), which operates in accordance with a resource-sharing protocol, such as Network Block Device (NBD) protocol or the like. The resource-sharing protocol is registered with the user's NFT digital wallet, which is in communication with the distributed trust computing networks and, thus links the local/user-side resources (i.e., NVRAM) with the distributed trust computing network for resource sharing capabilities.

17 Claims, 9 Drawing Sheets

(56) References Cited

U.S. PATENT DOCUMENTS

| | | |
|---|---|---|
| 2020/0112442 A1 | 4/2020 | Wentz |
| 2021/0152354 A1 | 5/2021 | Wentz |
| 2022/0123948 A1 | 4/2022 | Wentz et al. |
| 2022/0124013 A1 | 4/2022 | Chitalia et al. |
| 2023/0108366 A1* | 4/2023 | Tang .................. G06Q 20/3672 705/66 |
| 2023/0327893 A1* | 10/2023 | Paczkowski .......... H04L 9/3231 705/68 |

* cited by examiner

USER-SIDE NON-FUNGIBLE TOKEN STORAGE USING SUPER NON-VOLATILE RANDOM ACCESS MEMORY

FIELD OF THE INVENTION

The present invention is related to non-fungible tokens (NFTs) and, more specifically, using super non-volatile random access memory (NVRAM) and a resource sharing protocol to provide for user-side storage and processing computation of NFTs.

BACKGROUND

Non-Fungible Tokens (NFTs) including cryptocurrencies are becoming increasingly more prevalent. In order to create and share NFTs a user is typically required to interface with an NFT trading platform. With most NFT trading platforms the users are responsible for paying for computational resources required to process NFT transactions, including validating transactions within a distributed trust computing network (commonly referred to as a "blockchain network"). The amount of these computational resource assessments, commonly referred to as computational or "gas" assessments are typically not divulged to the user prior to the user agreeing to conduct a NFT transaction and will vary by marketplace and, in some instances, based on time-of-day or the like.

Therefore, a need exists to develop systems, methods and the like that would lessen and, in some instances eliminate the need for a user to incur computational resource assessments when creating and or exchanging an NFT.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by creating a system whereby a user's resources (i.e., memory) are used to store Non-Fungible Tokens (NFTs) and conduct requisite computational processes required for generating or exchanging an NFT. As such, according to embodiments of the invention, the user's computing device includes so-called "super" Non-Volatile Random Access Memory (NVRAM), which is NVRAM greater than or equal to one gigabyte (GB). The super NVRAM operates in accordance with a resource-sharing protocol, such as Network Block Device (NBD) protocol or the like, which allows for the super NVRAM to be shared with NFT trading platforms, and in particular, distributed trust computing networks, for purposes of generating NFTs and conducting computation processes used in the exchange of NFTs or the like.

Specifically, the user's NFT digital wallet, which identifies the user and is used as the means of resources for conducting a NFT exchange process is registered with the resource-sharing protocol, which in turn communicates with the distributed trust computing network. As such, the NFT digital wallet serves as the means for linking the resource, i.e., the super NVRAM on to the distributed trust computing network.

As a result, the present invention, provides for lessening and, in some instances, eliminating the need for the user to incur storage and/or computational processing assessments assessed by an NFT trading platform.

A system for user-side storage and processing of Non-Fungible Tokens (NFTs) defines first embodiments of the invention. The system includes a user computing platform having one or more first computing processing devices, and a first memory in communication with one or more first computing processing devices. The first memory comprises a minimum of one gigabyte (GB) of non-volatile random access memory (NVRAM) (i.e., so-called Super NVRAM) that operates in accordance with a resource-sharing protocol. The system additionally includes a public distributed trust computing network that includes decentralized nodes, each decentralized node having a second memory and one or more second computing processing devices in communication with the second memory. The public distributed trust computing network communicates with the user computing platform via the resource-sharing protocol. The NVRAM is configured to be shared with the public distributed trust computing for purposes of (1) storing a NFT (i) generated by the user computing platform or (ii) acquired by a user of the user computing platform and previously authenticated via consensus of a plurality of the decentralized nodes, and (2) performing first NFT processes that would otherwise be performed within the public distributed trust computing network.

In specific embodiments of the system, the user computing platform further comprises a Non-Fungible Token (NFT) digital wallet stored in the first memory, executable by at least one of the one or more first computing processing devices, registered with the resource-sharing protocol and configured to identify the user. In related embodiments of the system, the Non-Fungible Token (NFT) digital wallet is configured to provide an option for storing the NFT either in the NVRAM or a public storage. In further related embodiments of the system, a peer-to-peer network and content-addressing-based protocol is used to store the NFT in, and retrieve the NFT from, the NVRAM or the public storage. In such embodiments of the system, the content-addressing-based protocol is further defined as InterPlanetary File System (IPFS) protocol.

In other specific embodiments of the system, the resource-sharing protocol is further defined as network block device (NBD) protocol. In still further specific embodiment of the system, the resource-sharing protocol is configured to communicate with an Internet Protocol (IP) address on the public distributed trust computing network.

In additional specific embodiments of the system, the NVRAM is further configured for purposes of performing second NFT processes. In such embodiments of the system, the second NFT processes include NFT minting processes including one or more of (i) creating an NFT digital wallet, (ii) creating and interacting with one or more NFT contracts, (iii) connecting the NFT digital wallet to a marketplace, (iv) listing an NFT within a marketplace. In additional embodiments of the system, the second NFT processes comprise one or more of (i) acquiring or transferring an NFT, (ii) signing an NFT including mapping the NFT identifier and NFT contract address to a user identifier, and (iii) confirming an NFT including verifying an authenticity of the NFT and parties to transaction of the NFT.

An apparatus for storage and processing of Non-Fungible Tokens (NFTs) defines second embodiments of the invention. The apparatus comprises a user computing platform having one or more first computing processing devices, and a first memory in communication with one or more first computing processing devices that comprises a minimum of one gigabyte (GB) of non-volatile random access memory (NVRAM) that operates in accordance with a resource-sharing protocol. The NVRAM is configured to be shared for purposes of (1) storing a NFT (i) generated by the user computing platform or (ii) acquired by a user of the user computing platform and, (2) performing NFT processes that would otherwise be performed external to the user computing platform.

In specific embodiments of the apparatus, the user computing platform further includes a Non-Fungible Token (NFT) digital wallet stored in the first memory, executable by at least one of the one or more first computing processing devices, registered with the resource-sharing protocol and configured to identify the user.

In other specific embodiments of the apparatus, the resource-sharing protocol is further defined as network block device (NBD) protocol.

In still further specific embodiments of the apparatus, the NFT processes include NFT minting processes comprising one or more of (i) creating an NFT digital wallet, (ii) creating and interacting with one or more NFT contracts, (iii) connecting the NFT digital wallet to a marketplace, (iv) listing an NFT within a marketplace. In other such embodiments of the apparatus, the NFT processes include at least one of (i) acquiring or transferring an NFT, (ii) signing an NFT including mapping the NFT identifier and NFT contract address to a user identifier, and (iii) confirming an NFT including verifying an authenticity of the NFT and parties to transaction of the NFT.

A computer-implemented method for storage and processing of Non-Fungible Tokens (NFTs), at least a portion of the computer-implemented method is executed by one or more computing processing devices. The computer-implemented method includes providing for a user computing platform including one or more first computing processing devices, and a first memory in communication with one or more first computing processing devices that comprises a minimum of one gigabyte (GB) of non-volatile random access memory (NVRAM) that operates in accordance with a resource-sharing protocol. The computer-implemented method further includes storing in the NVRAM a Non-Fungible Token (i) generated by the user computing platform or (ii) acquired by a user of the user computing platform and previously authenticated by a public distributed trust computing network. In addition, the computer-implemented method includes executing NFT processes within the NVRAM that would otherwise be executed external to the user computing platform.

In specific embodiments of the computer-implemented method, providing further includes providing for the user computing platform further including a Non-Fungible Token (NFT) digital wallet stored in the first memory, executable by at least one of the one or more first computing processing devices, registered with the resource-sharing protocol and configured to identify the user.

In further specific embodiments of the computer-implemented method, executing the NFT processes further includes executing the NFT processes including executing NFT minting processes comprising one or more of (i) creating an NFT digital wallet, (ii) creating and interacting with one or more NFT contracts, (iii) connecting the NFT digital wallet to a marketplace, (iv) listing an NFT within a marketplace. In related embodiments of the computer-implemented method, executing the NFT processes further includes executing the NFT processes including executing at least one of (i) acquiring or transferring an NFT, (ii) signing an NFT including mapping the NFT identifier and NFT contract address to a user identifier, and (iii) confirming an NFT including verifying an authenticity of the NFT and parties to transaction of the NFT.

Thus, according to embodiments of the invention, which will be discussed in greater detail below, the present invention provides for a system whereby a user's resources (i.e., memory) are used to store Non-Fungible Tokens (NFTs) and conduct requisite computational processes required for generating or exchanging an NFT. The user's computing device is equipped with a minimum of one gigabyte (GB) of Non-Volatile Random Access Memory (NVRAM), which operates in accordance with a resource-sharing protocol, such as Network Block Device (NBD) protocol or the like. The resource-sharing protocol is registered with the user's NFT digital wallet, which is in communication with the distributed trust computing networks and, thus links the local/user-side resources (i.e., NVRAM) with the distributed trust computing network for resource sharing capabilities.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
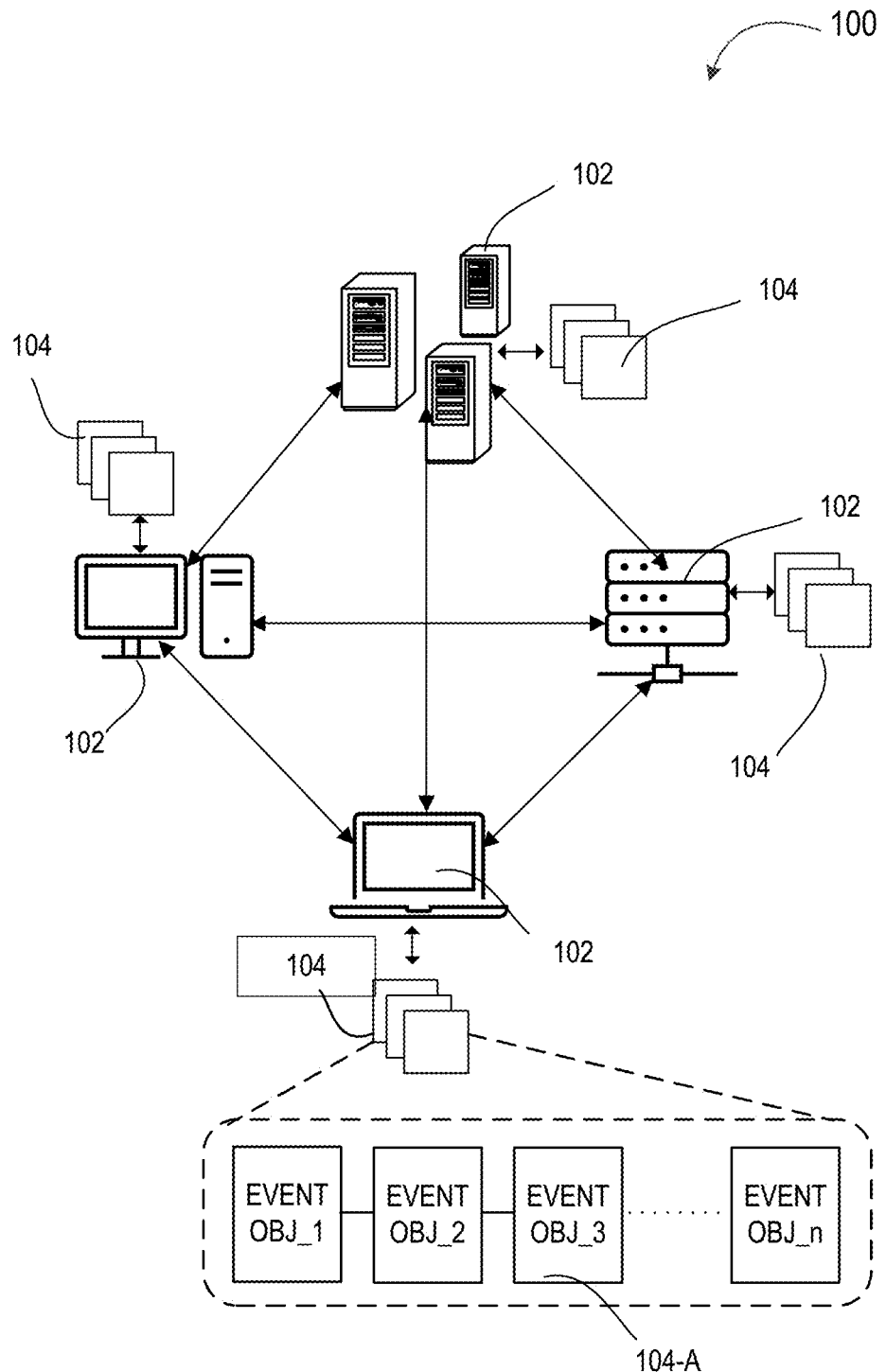
Figure 2:
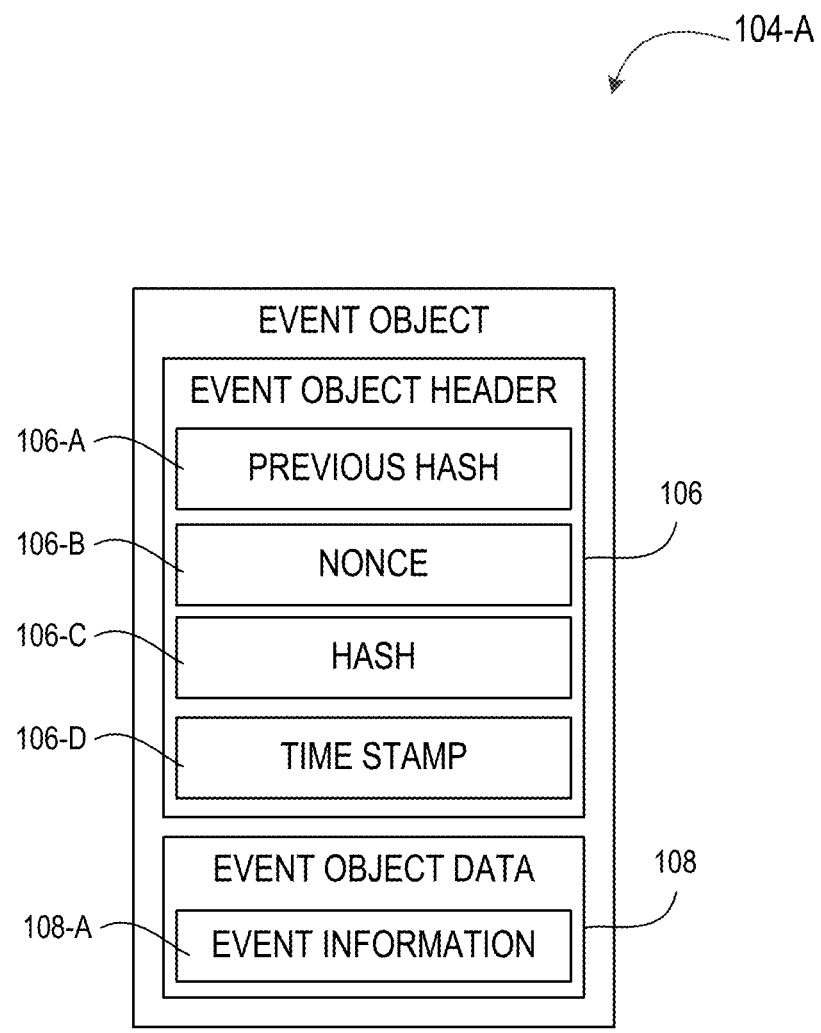
Figure 3:
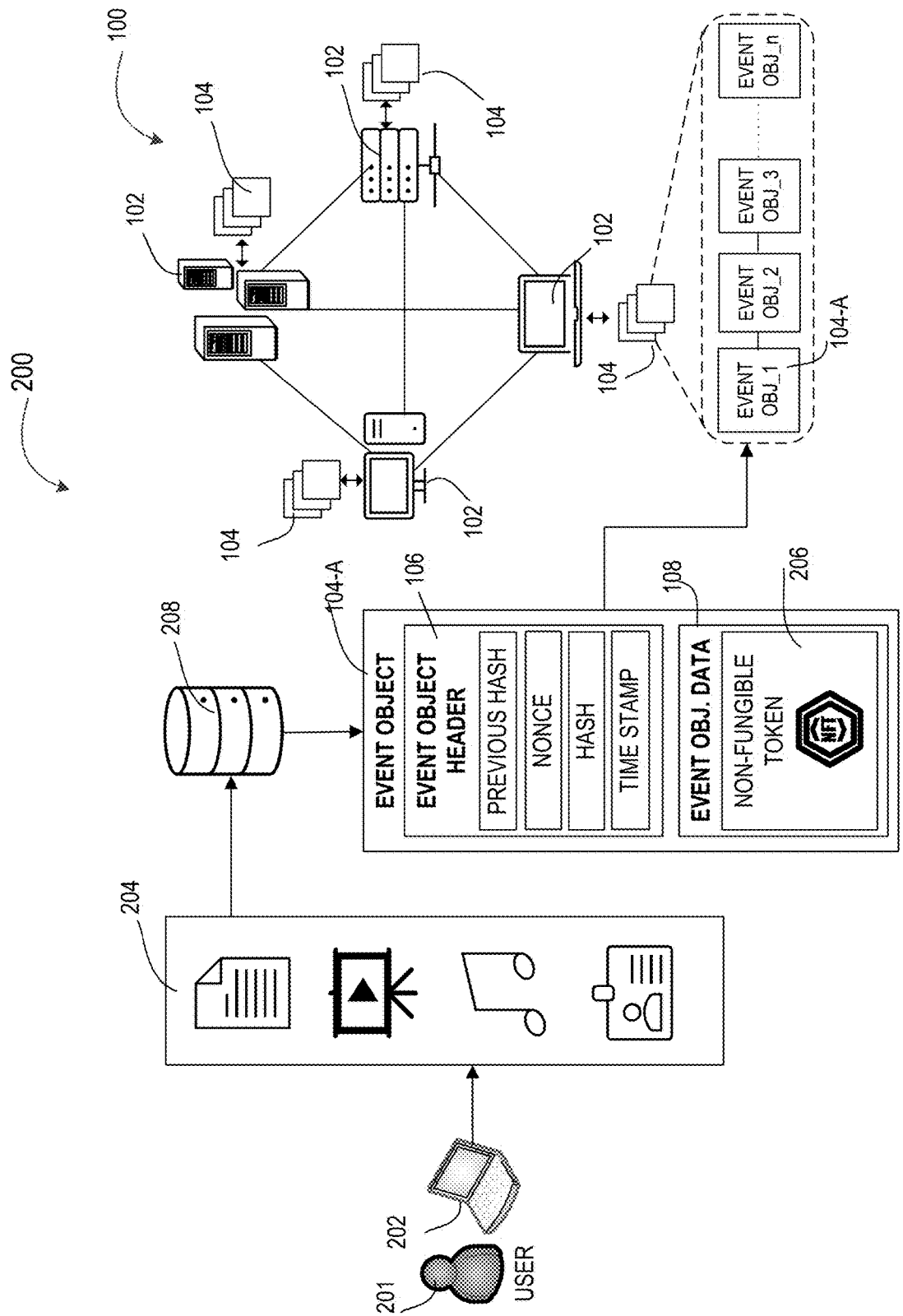
Figure 4:
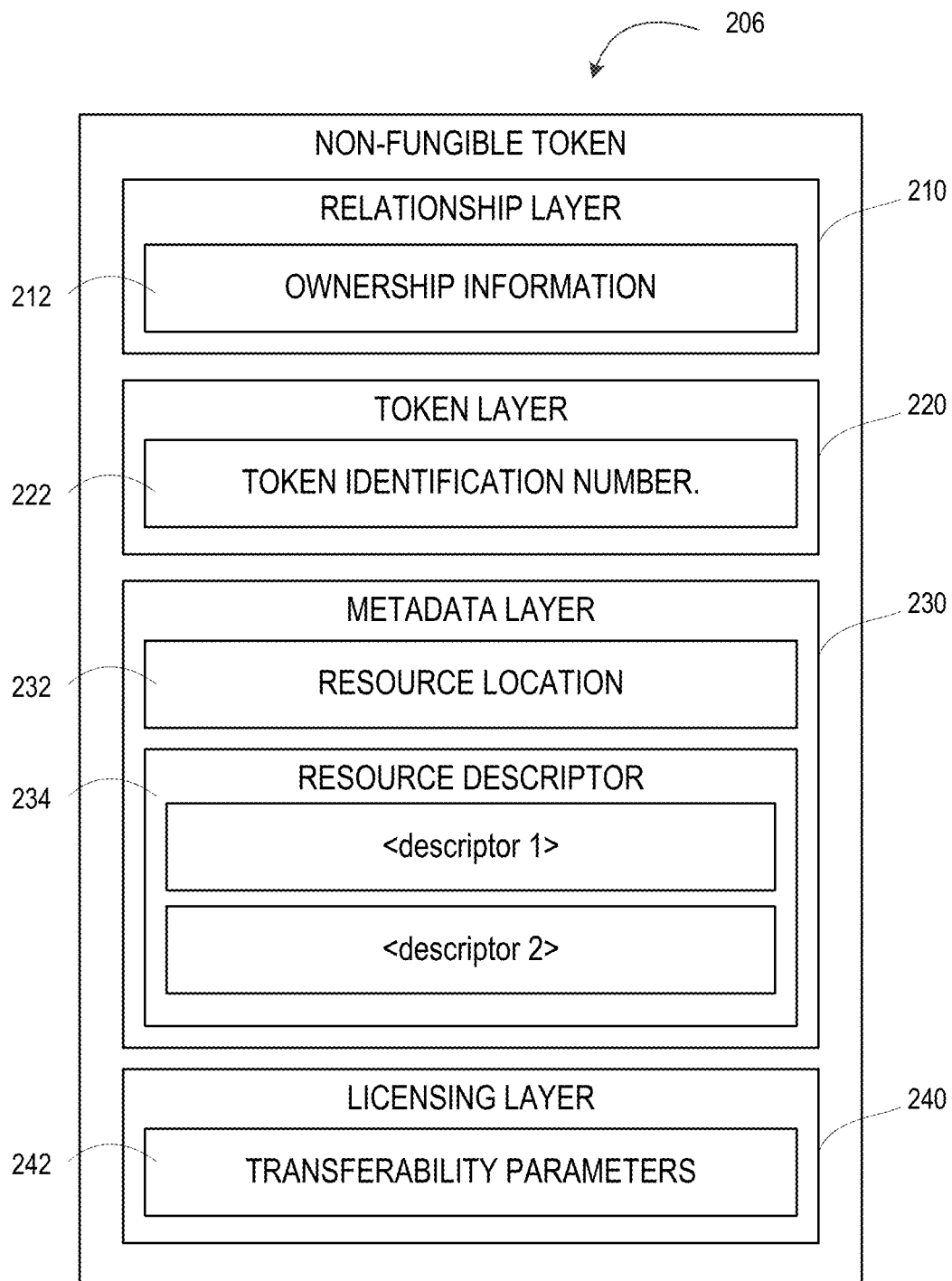
Figure 5:
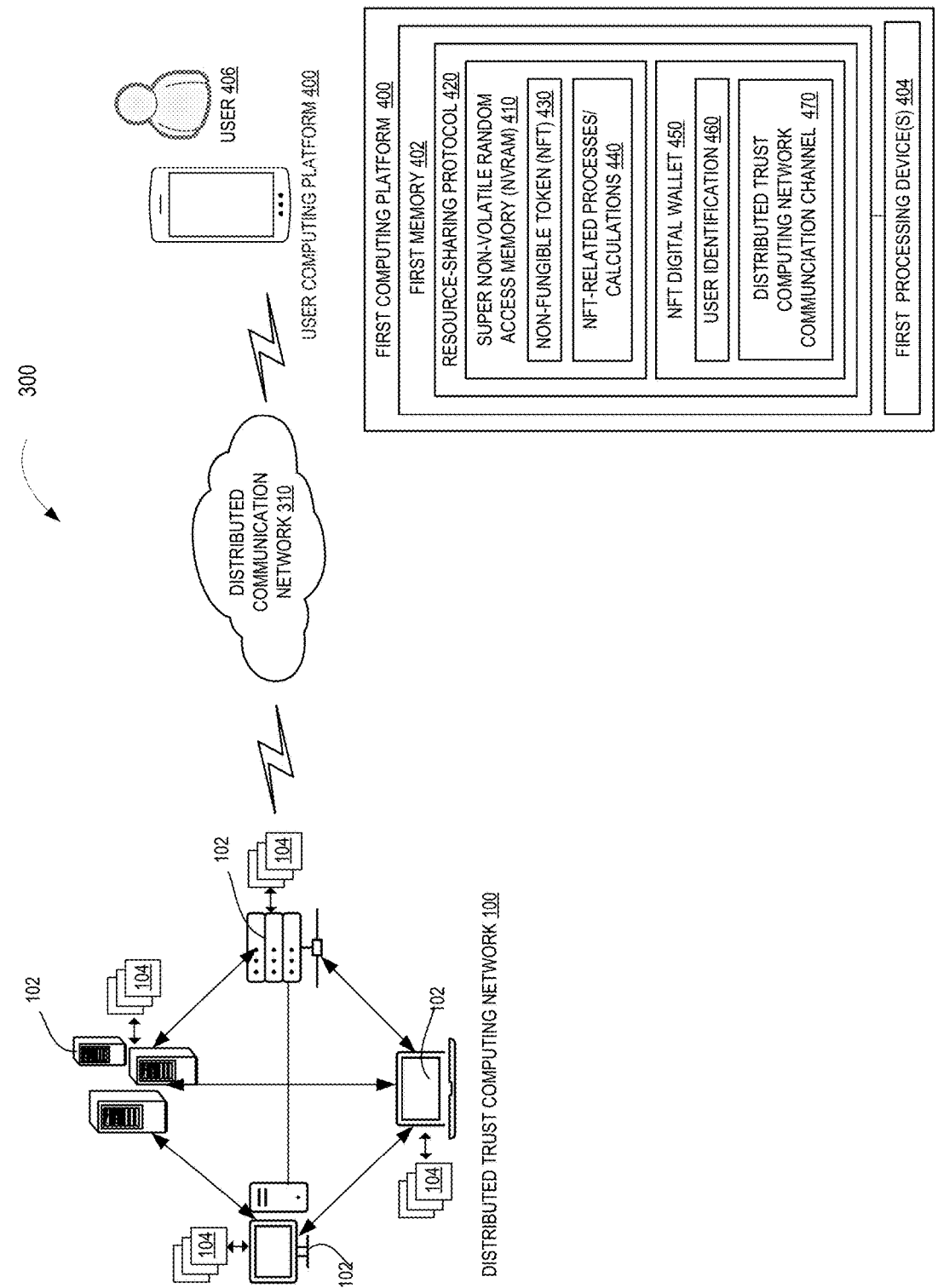
Figure 6:
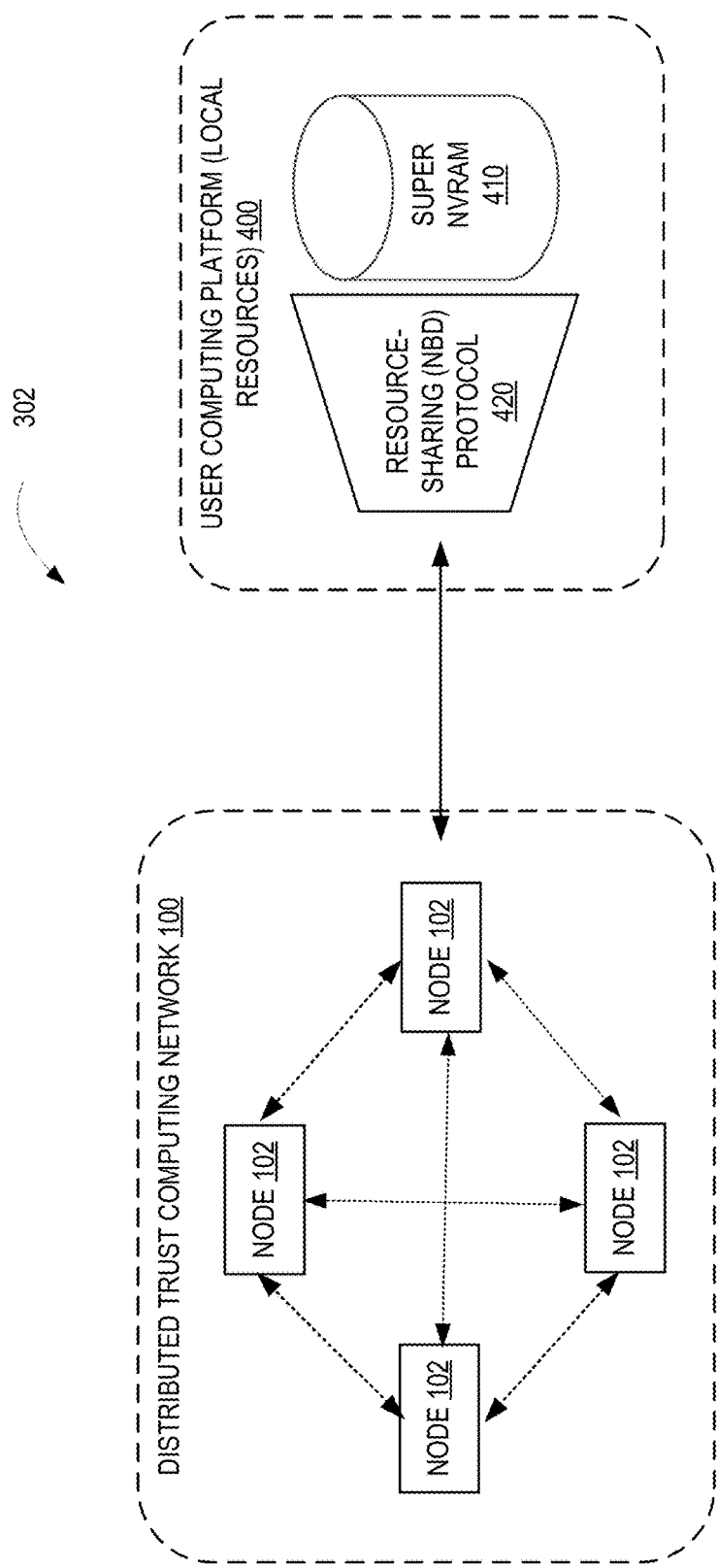
Figure 7:
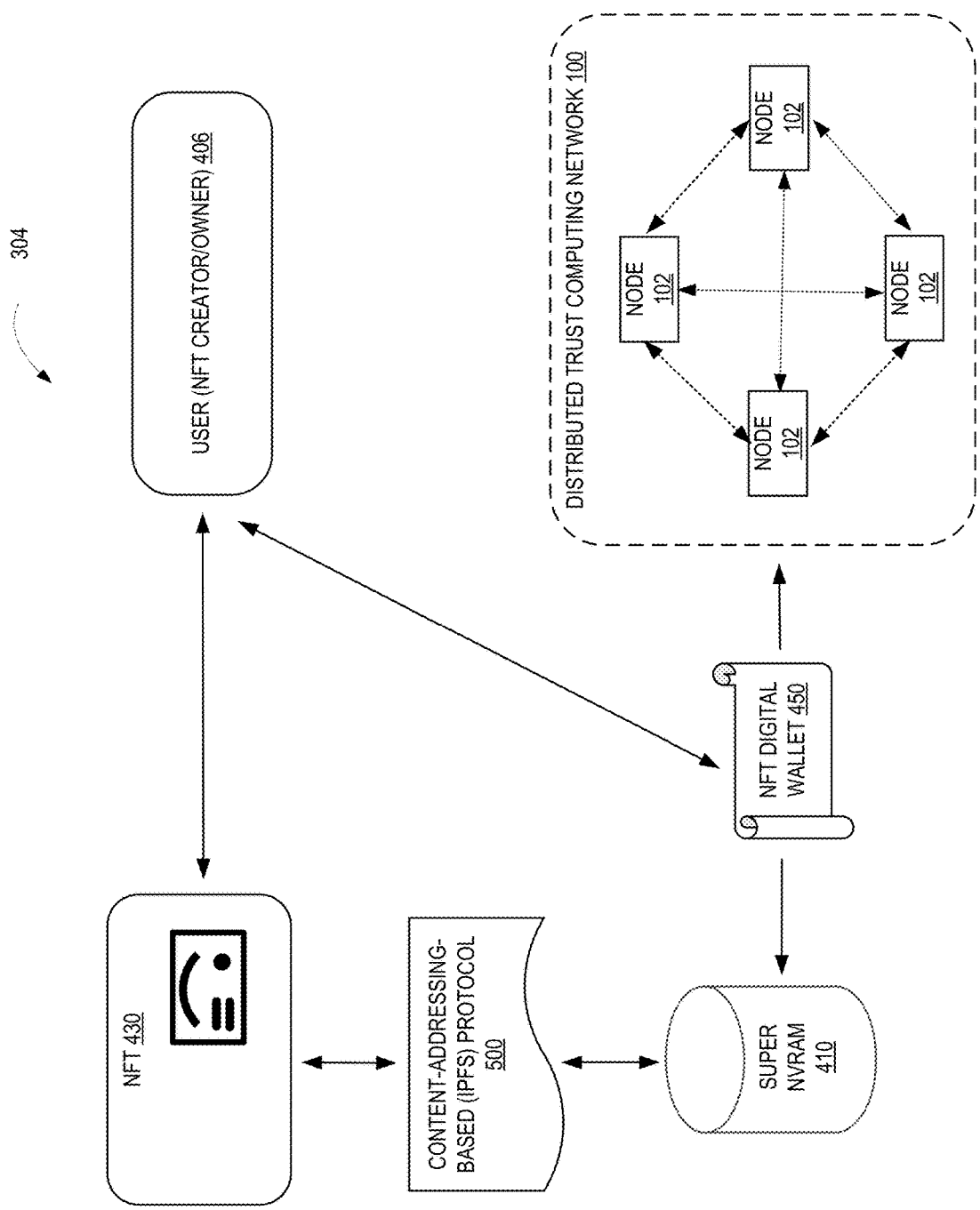
Figure 8:
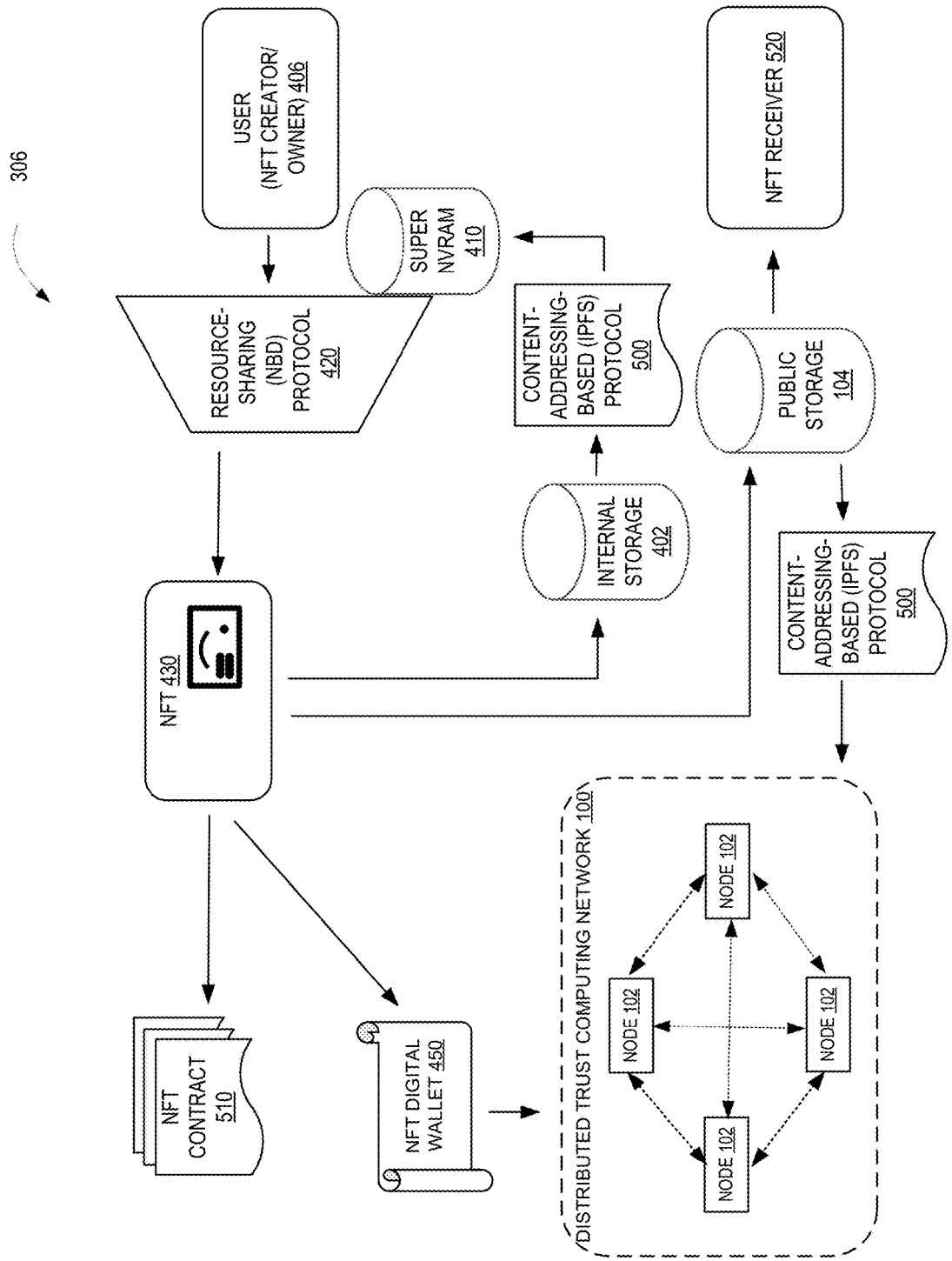
Figure 9:
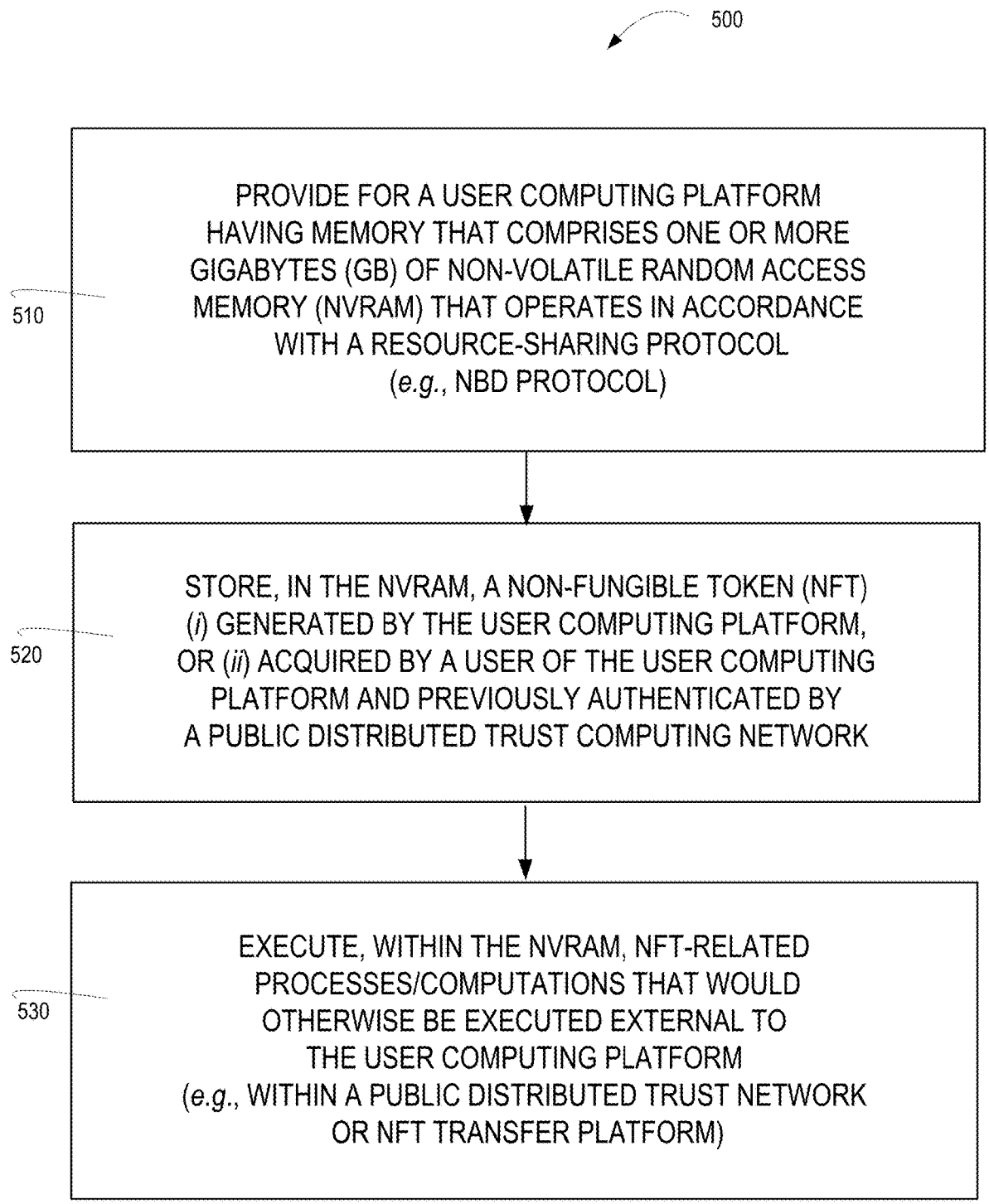

Having thus described embodiments of the disclosure in general terms, reference will now be made to the accompanying drawings, wherein:

FIG. 1 is a schematic diagram of a distributed trust computing network, in accordance with embodiments of the present invention;

FIG. 2 is a block diagram of an event object stored within a distributed ledger of a distributed trust computing network, in accordance with some embodiments of the present disclosure;

FIG. 3 is a schematic diagram of system for generating a Non-Fungible Token (NFT) and storing the NFT within a distributed trust computing network, in accordance with embodiments of the present invention;

FIG. 4 is a block diagram of an architecture for an exemplary NFT; in accordance with embodiments of the present invention;

FIG. 5 is a schematic/block diagram of a system for user-side storage and processing of an NFT, in accordance with embodiments of the present invention;

FIG. 6 is block diagram of a system implementing local resources including Super Non-Volatile Random Access Memory (NVRAM) and Resource Sharing protocol and a remote distributed trust computing network, in accordance with embodiments of the present invention;

FIG. 7 is a block diagram a system for NFT storage using Super NVRAM and a content-addressing-based protocol, such as InterPlanetary File System (IPFS) protocol, in accordance with embodiments of the present;

FIG. 8 is a comprehensive system for user-side storage and processing of NFTs, in accordance with embodiments of the present invention;

FIG. 9 is a flow diagram of a method for user-side/local storage of NFT and processing, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed for a system for utilizing user-side (i.e., local) resources (i.e., memory) to store Non-Fungible Tokens (NFTs) and conduct requisite computational processes required for generating or exchanging an NFT. As such, according to embodiments of the invention, the user's computing device includes so-called "super" Non-Volatile Random Access Memory (NVRAM), which is NVRAM greater than or equal to one gigabyte (GB). The super NVRAM operates in accordance with a resource-sharing protocol, such as Network Block Device (NBD) protocol or the like, which allows for the super NVRAM to be shared with NFT trading platforms, and in particular, distributed trust computing networks, for purposes of generating NFTs and conducting computation processes used in the exchange of NFTs or the like.

In specific embodiments of the invention, the user's NFT digital wallet, which identifies the user and is used as the means of resources for conducting a NFT exchange process, is registered with the resource-sharing protocol, which in turn communicates with the distributed trust computing network. As such, the NFT digital wallet serves as the means for linking the resource, i.e., the super NVRAM on to the distributed trust computing network.

As a result, the present invention, provides for lessening and, in some instances, eliminating the need for the user to incur storage and/or computational processing assessment levied by an NFT trading platform.

Turning now to the figures, FIGS. 1 and 2 illustrate an exemplary distributed ledger technology (DLT) architecture implemented in a distributed trust computing network (commonly referred to as a "blockchain" network), in accordance with an embodiment of the invention. DLT may refer to the protocols and supporting infrastructure that allow computing devices (peers) in different locations to propose and validate events and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of events represented as event objects that are linked. As event objects each include information about the event object previous to it, they are linked with each additional event object, reinforcing the previously ones stored prior. Therefore, distributed ledgers are resistant to modification of their data because once recorded, the data in any given event object cannot be altered retroactively without altering all subsequent event objects.

To permit events and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or may complement a traditional text-based contract and execute certain provisions, such as conducting an event between Party A (e.g., an NFT holder/owner) to Party B (e.g., a party desiring to acquire the NFT held/owned by Party A). The computer code of the smart contract itself is replicated across multiple nodes (peers) and, therefore, benefits from the security, permanence, and immutability that a distributed ledger offers. That replication also means that as each new event object is added to the distributed ledger, the code is, in effect, executed. If the parties have indicated, by initiating an event, that certain parameters have been met, the code will execute the step triggered by those parameters. If no such event has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general-purpose deployment of decentralized applications. A distributed ledger may be characterized as a public distributed ledger, a consortium distributed ledger, or a private (i.e., non-public and/or proprietary) distributed ledger. A public distributed ledger is a distributed ledger that any entity can access, communicate events to and expect to see them stored thereon if they nodes of the distributed trust computing network come to a consensus and find the events to be valid. Further, any entity can participate in the consensus process for determining which event objects are valid and, therefore, are added to the distributed ledger and determination of the current state of each event object. A public distributed ledger is generally considered to be fully decentralized. On the other hand, a fully private distributed ledger is a distributed ledger in which permissions are kept centralized with one entity (i.e., the entity that controls/owns the private distributed trust computing network and the private distributed ledgers stored thereon). The permissions may be public or restricted to an arbitrary extent. And lastly, a consortium distributed ledger is a distributed ledger where the consensus process is controlled by a pre-selected set of nodes; for example, a distributed ledger may be associated with a specified number of member institutions, each of which operate in such a way that a quorum of the members must sign every event object in order for the event object to be valid. The right to access such a distributed ledger may be public or restricted to the participants. Consortium distributed ledgers may be considered partially decentralized.

As shown in FIG. 1, an exemplary distributed trust computing network 100 includes a distributed ledger 104 being maintained on multiple devices (nodes) 102 that are authorized to keep track of the distributed ledger 104. For example, the nodes 102 may be one or more computing devices such as a comprehensive computing system and one or more client device(s). Each node 102 in the distributed trust computing network 100 may have a complete or partial copy of the entire distributed ledger 104 or set of events and/or event objects 104-A on the distributed ledger 104. Events are initiated at a node and communicated to the various nodes in the distributed trust computing network 100. For purposes of the present invention, an event may comprise verification of the authenticity/ownership of a newly minted NFT, such as cryptocurrency or the like or the transfer of an NFT for one party to another party. Any of the nodes 102 can validate an event, record the event to its copy of the distributed ledger 104, and/or broadcast the event, the validation of the event (in the form of an event object) and/or other data to other nodes 102.

As shown in FIG. 2, an exemplary event object 104-A includes an event header 106 and an event object data 108. The event header 106 may include a cryptographic hash of the previous event object 106-A; a nonce 106-B, i.e., a randomly generated 32-bit whole number; a cryptographic hash of the current event object 106-C wedded to the nonce 106-B; and a time stamp 106-D. The event object data 108 may include event information 108-A being recorded. Once the event object 104-A is generated, the event information 108-A is considered signed and forever tied to its nonce 106-B and hash 106-C. Once generated, the event object 104-A is then deployed on the distributed ledger 104. At this time, a distributed ledger address is generated for the event object 104-A, i.e., an indication of where the event object is located on the distributed ledger 104 and captured for recording purposes. Once deployed, the event information 108-A is considered recorded in the distributed ledger 104.

FIG. 3 illustrates an exemplary process of generating a Non-Fungible Token (NFT) 200, in accordance with an embodiment of the invention. One of ordinary skill in the art will readily appreciate that an NFT is a cryptographic record (referred to as a "token") that is linked to resources, such as digital objects or the like. One form of an NFT is cryptocurrency. While an NFT is typically stored on a distributed ledger 104 of a distributed trust computing network 100, according to embodiments of the present invention, an NFT may be stored locally, on a user's computing device implementing super NVRAM storage and a resource-sharing protocol, such as NBD protocol or the like. The storage of the NFT on the distributed ledger 104 means that various nodes 102 of the distributed trust computing network 100 have reached a consensus as to the ownership and validity/authenticity of the NFT, i.e., the linked data.

As shown in FIG. 3, to generate, otherwise referred to as "minting" an NFT, a user (e.g., NFT owner) may identify, using a user input device 202, resources 204 that the user wishes to mint as an NFT. Typically, the resources 204 used to generate the NFTs are digital objects that represent both tangible and intangible objects. These resources 204 may include a piece of art, music, collectible, virtual world items, videos, real-world items such as artwork and real estate, or any other presumed valuable object. These resources 204 are then digitized into a proper format to generate the NFT 206. The NFT 206 may be a multi-layered documentation that identifies the resources 204 but also evidences various event conditions associated therewith.

To record the NFT 206 in a distributed ledger 104, an event object 104-A for the NFT 206 is created using data stored in database 208. As previously discussed in relation to FIG. 2, the event object 104-A includes an event object header 106 and an event object data 108. The event object header 106 includes a cryptographic hash of the previous event object, a nonce (i.e., a random 32-bit whole number generated when the event object is created), a cryptographic hash of the current event object wedded to the nonce, and a time stamp. The event object data 108 includes the NFT 206 being recorded. Once the event object 104-A is generated, the NFT 206 is considered signed and persistently tied to its corresponding nonce and hash. The event object 104-A is then deployed in the distributed ledger 104. At this time, a distributed ledger address is generated for the event object 104-A, i.e., an indication of where the NFT 206 is located on the distributed ledger 104 and captured for recording purposes. Once deployed, the NFT 206 is linked permanently to the corresponding hash and the distributed ledger 104, and is considered recorded in the distributed ledger 104, thus concluding the generation/minting process.

As shown in FIG. 3 and previously discussed in relation to FIG. 1, the distributed ledger 104 may be maintained on multiple devices (nodes) 102 of the distributed trust computing network 100; the multiple nodes 102 are authorized to keep track of the distributed ledger 104. For example, the multiple nodes 104 may be computing devices such as a computing system or end-point device(s). Each node 102 may have a complete or partial copy of the entire distributed ledger 104 or set of events and/or event objects on the distributed ledger 104. Events, such as the creation and recordation of a NFT 206, the transfer of an NFT are initiated at a node 102 and communicated to the various nodes 102. Any of the nodes 102 can validate an event, record the event to the corresponding copy of the distributed ledger 104, and/or broadcast the event, its validation (in the form of an event object 104-A) and/or other data to other nodes 102.

FIG. 4 illustrates an exemplary NFT 206 as a multi-layered documentation of a resource 204, in accordance with an embodiment of an invention. As shown in FIG. 4, the NFT 206 may include at least relationship layer 210, a token layer 220, a metadata layer 230, and, when applicable, a licensing layer 240. The relationship layer 210 may include ownership information 212, including a map of various users that are associated with the resource and/or the NFT 206, and their relationship to one another. For example, if the NFT 206 is purchased by buyer B1 from a seller S1, the relationship between B1 and S1 as a buyer-seller is recorded in the relationship layer 210. In another example, if the NFT 206 is owned by O1 and the resource itself is stored in a storage facility by storage provider SP1, then the relationship between O1 and SP1 as owner-file storage provider is recorded in the relationship layer 210. The token layer 220 may include a token identification number 222 that is used to identify the NFT 206. The metadata layer 230 may include at least a file location 232 and a file descriptor 234. The file location 232 provides information associated with the specific location of the resource 204, which according to embodiments of the present invention may the location (e.g., Internet Protocol (IP) address or the like) of the local NVRAM memory or the like. Depending on the conditions listed in the smart contract underlying the distributed ledger 104, the resource 204 may be stored on-chain, i.e., directly on the distributed ledger 104 along with the NFT 206, or off-chain, i.e., in an external storage location, such as local super NVRAM or the like. The file location 232 identifies where the resource 204 is stored. The file descriptor 234 includes specific information associated with the source itself. For example, the file descriptor 234 may include information about the supply, authenticity, lineage, provenance of the resource 204. The licensing layer 240 may include any transferability parameters 242 associated with the NFT 206, such as restrictions and licensing rules associated with purchase, sale, and any other types of transfer of the resource 204 and/or the NFT 206 from one person to another. Those skilled in the art will appreciate that various additional layers and combinations of layers can be configured as needed without departing from the scope and spirit of the invention.

Referring to FIG. 5, a schematic/block diagram is provided of a system 300 for user-side/local storage and/or processing of a Non-Fungible Token (NFT), in accordance with embodiments of the present invention. The system 300 includes a user computing platform 400, which may comprise a mobile communication device (as depicted), a personal computer (PC), a laptop or any other suitable computing device(s) in possession of user 406. User computing platform 400 includes a first memory 402 and one or more first processing devices 404 in communication with the first memory 402. First memory 402 includes a minimum of one gigabyte (GB) (i.e., so-called "super") of non-volatile random access memory (NVRAM) 410. In alternate embodiments of the invention, first memory 402 includes a minimum of 1-2 terabyte (TB) of NVRAM 410 or a minimum of 1-2 petabytes (PB) of NVRAM 410. Super NVRAM 410 operates in accordance with resource-sharing protocol 420, such as Network Block Device (NBD) protocol or the like. In specific embodiments of the invention, super NVRAM 410 and resource-sharing protocol 420 reside one distinct component that may reside within or be external to and in communication with user computing device.

In specific embodiments of the system 1300, first memory 402 of user computing platform 300 includes NFT digital wallet 450 that is executable by one or more of the first computing processing devices, registered with the resource-sharing protocol 420 and configured to provide user identification 460 to an NFT trading platform and the distributed trust computing network 100. In this regard, the resource-sharing protocol 420 provides the communication channel 470 to the NFT trading platform and the public distributed trust computing network 100. Further, the NFT digital wallet 450 links the NFT 430/resources on to the distributed trust computing network 100.

System 300 additionally includes public distributed trust computing network 100 that is in communication with user computing platform 400 via distributed communication network 310, which may comprise the Internet, one or more intranets, one or more cellular networks or the like. Public distributed trust computing network 100 includes decentralized nodes 102, each decentralized node 102 having a second memory (not shown in FIG. 5) and one or more second computing processing device(s) (not shown in FIG. 5) in communication with the second memory.

The public distributed trust computing network 100 is configured to communicate with the user computing platform 400 via the resource-sharing protocol 420. In this regard, the super NVRAM 410 is configured to shared with the public distributed trust computing network 100 for purposes of (i) storing an NFT 430 generated by the user computing platform 400 or acquired by the user of the user computing platform 400 and previously authenticated via consensus of the decentralized nodes 102 of the distributed trust computing network 100 and (ii) performing NFT processes/calculations 440 that would otherwise be performed within the public distributed trust computing network or within an NFT trading platform. Such NFT processes include, but are not limited to, generating/minting the NFT, including (i) creating an NFT digital wallet, (ii) creating and/or interacting with one or more NFT contracts, (iii) connecting the NFT digital wallet to an NFT trading platform/marketplace, (iv) listing an NFT within an NFT trading platform/marketplace, or the like. In addition, the NFT processes/computations that may be performed locally within the super NVRAM include, but are not limited to, acquiring or transferring an NFT (including donating an NFT), signing an NFT including mapping the NFT identifier and NFT contract address to a user identifier, confirming an NFT including verifying an authenticity of the NFT and parties to a transaction of the NFT.

Referring to FIG. 6, a block diagram is of a system 302 for implementing a resource-sharing protocol 420 on a distributed trust computing network 100, in accordance with embodiments of the present invention. As previous discussed in relation to FIG. 5, user computing platform 400, otherwise referred to as local resources 400 include super NVRAM 410 which operates according to resource-sharing protocol 420, such as NBD protocol or the like. The super NVRAM 410 combines with the physical memory (i.e., existing RAM/ROM) of the user computing platform to provide the capability for storing the NFT and conducting NFT-related processes/computations. The resource-sharing protocol 420 is used as the gateway to provide the remote resources (i.e., the local super NVRAM 410) to the public distributed trust computing network 100. In this regard, the resource-sharing protocol 420 acts as the framework for resource transfer and communication between the user computing platform 300 and the public distributed trust computing network 100. In specific embodiments of the invention, the resource-sharing protocol 420 is configured to allocate a specific amount of the NVRAM to the public distributed trust computing network 100 for purposes of storing an NFT or conducting an NFT-related process/computation. In other embodiments of the invention, the resource-sharing protocol 420 is configured to allow for the public distributed trust computing network 100 to use as much NVRAM as necessary to store an NFT or conduct an NFT-related process/computation. The nodes 102 of the public distributed computing network 100 will be called upon for consensus purposes to authenticate a newly minted NFT or a transaction involving an NFT.

Referring to FIG. 7, a block diagram is presented of a system 304 for NFT storage using a content-addressing-based protocol, such as InterPlanetary File System (IPFS) protocol and super NVRAM, in accordance with embodiments of the present invention. User 406 creates/generates an NFT 430 or otherwise acquires an NFT 430, which is then registered with an NFT trading platform or the like. The content-addressing-based protocol 500, such as IPFS protocol is used to data transfer, such as storing the NFT 430 in, and retrieve the NFT from, the super NVRAM 410. The NFT digital wallet 450 is used lock and bind the NFT to the public distributed trust computing network 100, which is implemented for purposes of authenticating a newly minted NFT 430 or an acquisition transaction involving the NFT 430.

Referring to FIG. 8 a block diagram is presented of a system 306 for local storage and processing of an NFT, in accordance with embodiments of the present invention. User 406 creates an NFT 430 and registers the NFT 430 (on a private distributed trust computing network (not shown in FIG. 8) or the like) with one or more NFT contracts 510 for transaction tracing purposes. The NFT 430 is uploaded to the private distributed trust computing network through an application programming interface (API), such as a JavaScript Object Notation (JSON) API or the like.

The user's NFT digital wallet 450 is linked to the registered NFT and uses the resource-sharing protocol 420, such as NBD protocol or the like and the super NVRAM 410 to accomplish resource sharing realization. Further, the resource sharing protocol 420 is configured to allocate the required NVRAM and other resources (e.g., processing capabilities) that would be required for the NFT to be transferred, listed or published onto the public distributed trust computing network 100. In response, the NFT 430 is moved onto public distributed trust commuting network 100 for purposes of authentication (i.e., consensus amongst a plurality of the decentralized nodes 102).

Once the NFT 430 has been authenticated on the public trust computing network 100, the local resources (i.e., NVRAM and processing) are allocated to subsequent NFT-related processes based on preconfigured conditions defined in the NFT contract(s) 510.

Subsequently, the NFT digital wallet 450 provides the user the option to store the NFT either within internal/private storage (e.g., first memory 402 of user computing platform 400) or within public storage (e.g., cloud or distributed ledger 104 of distributed trust computing network 100). Content-addressing-based protocol, such as IPFS protocol or the like is used to transfer the NFT to the public or private storage location and subsequently access/retrieve the NFT from the storage location as need requires.

Transfer of the NFT to NFT receiver 520 occurs per the address on the NFT digital wallet identifier. When processing resources are required for the acquisition/transfer process, the resource-sharing protocol 420, such as NBD protocol is utilized to provide the requisite super NVRAM needed to perform the processes/computations.

Referring to FIG. 9, a flow diagram is presented of a method 500 for local/user-side storage and processing of an NFT, in accordance with embodiments of the present invention. At Event 510, a local/user-side computing platform is provided that includes memory that comprises a minimum of 1 GB (and in some embodiments a minimum of 1 TB, 1 PB or the like) of Non-Volatile Random Access Memory (NVRAM) that operates in accordance with a resource-sharing protocol, e.g., Network Block Device (NBD) protocol. In specific embodiments of the method, the NVRAM and the resource-sharing protocol embodied in single component included within or in communication with the local/user-side computing device.

At Event 520, a NFT token that is either generated by the user computing platform (e.g., NFT digital wallet) or acquired by the user and has been previously authenticated/verified by a public trust computing network is stored within the NVRAM. A content-addressing-based protocol, such as IPFS protocol or the like is used to communicate the NFT from the public distributed trust computing network to the internal storage (i.e., NVRAM).

At Event 530, one or more NFT-related processes that would otherwise be executed external from the user computing platform are executed within the NVRAM. Such NFT-related processes would otherwise be executed within an NFT transfer platform (e.g., within a public distributed trust computing network or the like). Such processes include, but are not limited to, process related to minting/generating an NFT, acquiring/transferring an NFT, signing an NFT and confirming an NFT.

Thus, present embodiments of the invention provide for a system in which local/user-side resources (i.e., memory) are used to store Non-Fungible Tokens (NFTs) and conduct NFT-related computational processes required for generating or exchanging an NFT. The user's computing device is equipped or in communication with super Non-Volatile Random Access Memory (NVRAM), which operates in accordance with a resource-sharing protocol, such as Network Block Device (NBD) protocol or the like. The resource-sharing protocol is registered with the user's NFT digital wallet, which is in communication with the distributed trust computing networks and, thus links the local/user-side resources (i.e., NVRAM) with the distributed trust computing network for resource sharing capabilities.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A system for user-side storage and processing of Non-Fungible Tokens (NFTs), the system comprising:
   a user computing platform including:
      one or more first computing processing devices,
      a first memory in communication with at least one of the one or more first computing processing devices and comprising a minimum of one gigabyte (GB) of non-volatile random access memory (NVRAM) that operates in accordance with a resource-sharing protocol,
      a Non-Fungible Token (NFT) digital wallet stored in the first memory, executable by at least one of the one or more first computing processing devices, registered with the resource-sharing protocol and configured to identify the user; and
   a public distributed trust computing network comprising decentralized nodes, each decentralized node having a second memory and one or more second computing processing devices in communication with the second memory, wherein the public distributed trust computing network communicates with the user computing platform via the resource-sharing protocol,
   wherein the NVRAM is configured to be shared with the public distributed trust computing for purposes of (1) storing a NFT (i) generated by the user computing platform or (ii) acquired by a user of the user computing platform and previously authenticated via consensus of a plurality of the decentralized nodes, and (2) performing first NFT processes that would otherwise be performed within the public distributed trust computing network.

2. The system of claim 1, wherein the Non-Fungible Token (NFT) digital wallet is configured to provide an option for storing the NFT either in the NVRAM or a public storage.

3. The system of claim 2, wherein a peer-to-peer network and content-addressing-based protocol is used to store the NFT in, and retrieve the NFT from, the NVRAM or the public storage.

4. The system of claim 3, wherein the content-addressing-based protocol further comprises InterPlanetary File System (IPFS) protocol.

5. The system of claim 1, wherein the resource-sharing protocol further comprises network block device (NBD) protocol.

6. The system of claim 1, wherein the resource-sharing protocol is configured to communicate with an Internet Protocol (IP) address on the public distributed trust computing network.

7. The system of claim 1, wherein the NVRAM is configured for purposes of performing second NFT processes, wherein the second NFT processes include NFT minting processes comprising one or more of (i) creating an NFT digital wallet, (ii) creating and interacting with one or more NFT contracts, (iii) connecting the NFT digital wallet to a marketplace, (iv) listing an NFT within a marketplace.

8. The system of claim 1, wherein the NVRAM is configured for purposes of performing second NFT processes, wherein the second NFT processes comprise acquiring or transferring an NFT.

9. The system of claim 1, wherein the NVRAM is configured for purposes of performing second NFT processes, wherein the second NFT processes comprise signing an NFT including mapping a NFT identifier and a NFT contract address to a user identifier.

10. The system of claim 1, wherein the NVRAM is configured for purposes of performing second NFT processes, wherein the second NFT processes comprise confirming an NFT including verifying an authenticity of the NFT and parties to transaction of the NFT.

11. An apparatus for storage and processing of Non-Fungible Tokens (NFTs), the apparatus comprising:
   a user computing platform including:
      one or more first computing processing devices,
      a first memory in communication with at least one of the one or more first computing processing devices and comprising a minimum of one gigabyte (GB) of non-volatile random access memory (NVRAM) that operates in accordance with a resource-sharing protocol,
      a Non-Fungible Token (NFT) digital wallet stored in the first memory, executable by at least one of the one or more first computing processing devices, registered with the resource-sharing protocol and configured to identify the user; and
   wherein the NVRAM is configured to be shared for purposes of (1) storing a NFT (i) generated by the user computing platform or (ii) acquired by a user of the user computing platform and, (2) performing NFT processes that would otherwise be performed external to the user computing platform.

12. The apparatus of claim 11, wherein the resource-sharing protocol further comprises network block device (NBD) protocol.

13. The apparatus of claim 11, wherein the NVRAM is configured for purposes of performing the NFT processes, wherein the NFT processes include NFT minting processes comprising one or more of (i) creating an NFT digital wallet, (ii) creating and interacting with one or more NFT contracts, (iii) connecting the NFT digital wallet to a marketplace, (iv) listing an NFT within a marketplace.

14. The apparatus of claim 11, wherein the NVRAM is configured for purposes performing the NFT processes, wherein the NFT processes comprise at least one of (i) acquiring or transferring an NFT, (ii) signing an NFT including mapping the NFT identifier and NFT contract address to a user identifier, and (iii) confirming an NFT including verifying an authenticity of the NFT and parties to transaction of the NFT.

15. A computer-implemented method for storage and processing of Non-Fungible Tokens (NFTs), the computer-implemented method is executed by one or more computing processing devices and comprises:

providing for a user computing platform including (i) one or more first computing processing devices, (ii) a first memory in communication with at least one of the one or more first computing processing devices that comprises a minimum of one gigabyte (GB) of non-volatile random access memory (NVRAM) that operates in accordance with a resource-sharing protocol and (iii) a Non-Fungible Token (NFT) digital wallet stored in the first memory, executable by at least one of the one or more first computing processing devices, registered with the resource-sharing protocol and configured to identify the user;

storing in the NVRAM a Non-Fungible Token (i) generated by the user computing platform or (ii) acquired by a user of the user computing platform and previously authenticated by a public distributed trust computing network; and executing NFT processes within the NVRAM that would otherwise be executed external to the user computing platform.

16. The computer-implemented method of claim 15, wherein executing the NFT processes further comprises executing the NFT processes including executing NFT minting processes comprising one or more of (i) creating an NFT digital wallet, (ii) creating and interacting with one or more NFT contracts, (iii) connecting the NFT digital wallet to a marketplace, (iv) listing an NFT within a marketplace.

17. The computer-implemented method of claim 15, wherein executing the NFT processes further comprises executing the NFT processes including executing at least one of (i) acquiring or transferring an NFT, (ii) signing an NFT including mapping the NFT identifier and NFT contract address to a user identifier, and (iii) confirming an NFT including verifying an authenticity of the NFT and parties to transaction of the NFT.

* * * * *